W. BOSS.
GRASS COLLECTOR.
APPLICATION FILED FEB. 25, 1909.
1,032,180.
Patented July 9, 1912.
2 SHEETS—SHEET 1.
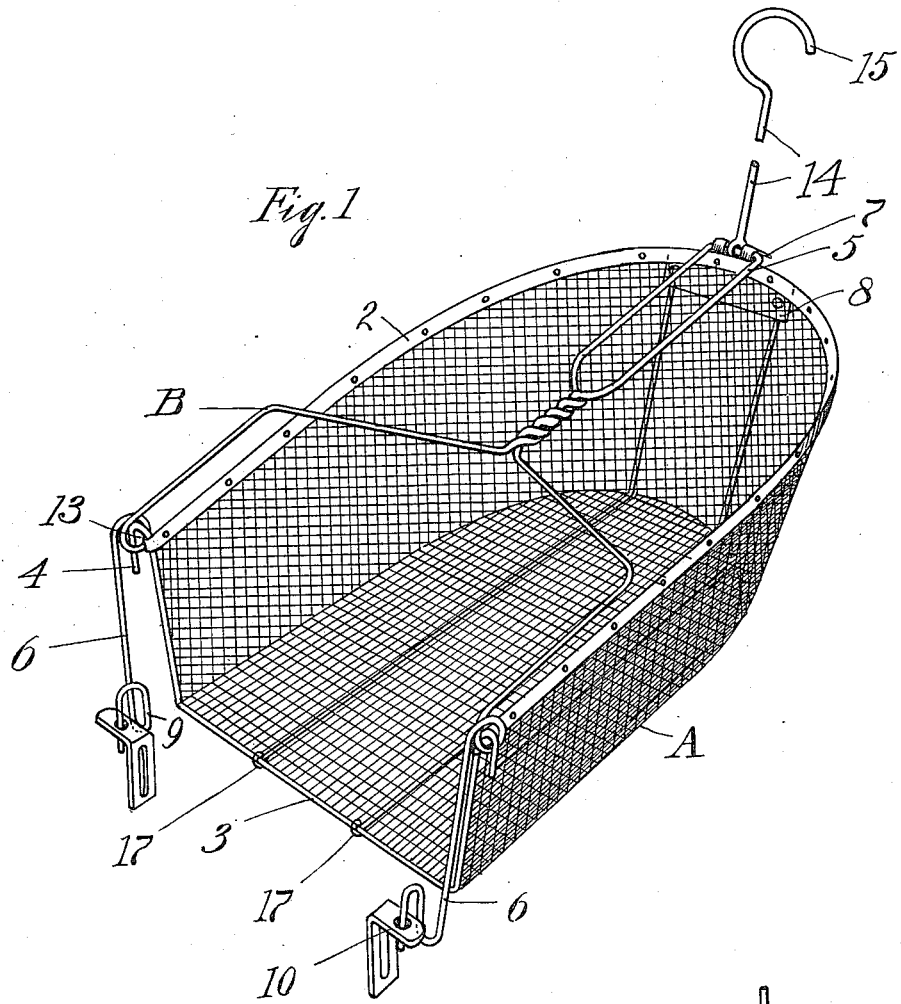
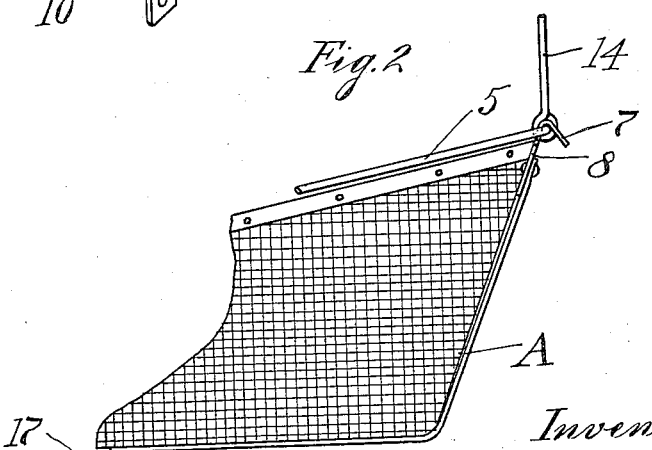
Witnesses,
George Voelker
H. Smith
Inventor,
William Boss
by Lothrop Johnson
his Attorneys.

W. BOSS.
GRASS COLLECTOR.
APPLICATION FILED FEB. 25, 1909.
1,032,180.
Patented July 9, 1912.
2 SHEETS—SHEET 2.
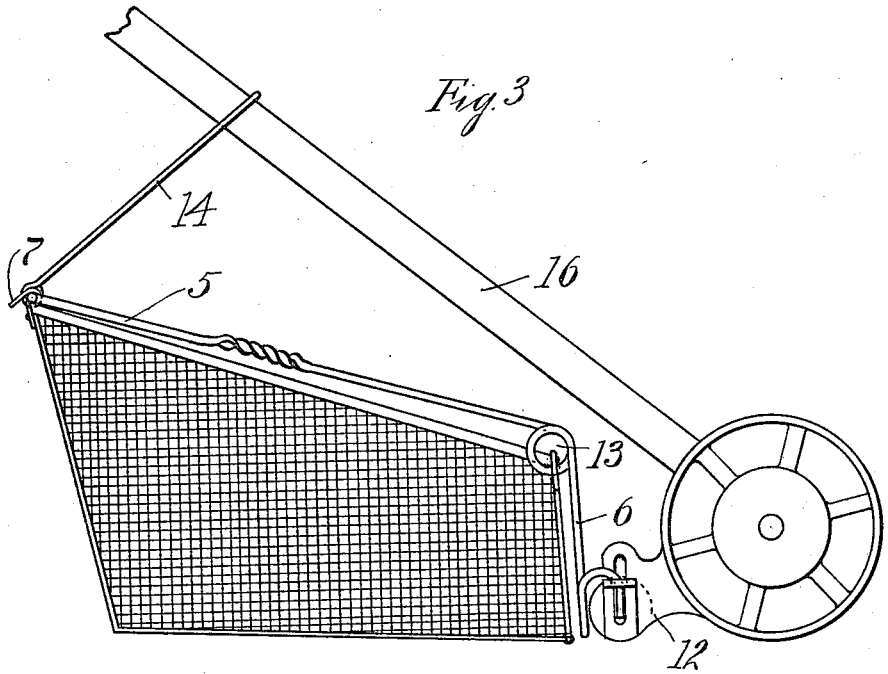
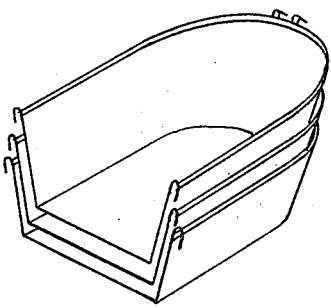
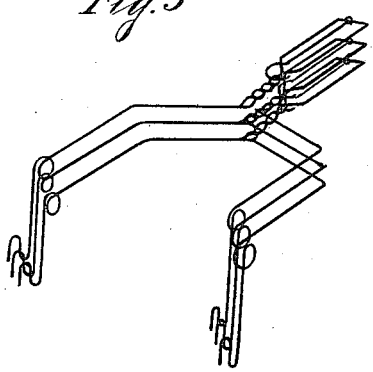

UNITED STATES PATENT OFFICE.

WILLIAM BOSS, OF ST. PAUL, MINNESOTA.

GRASS-COLLECTOR.

1,032,180.

Specification of Letters Patent.   Patented July 9, 1912.

Application filed February 25, 1909.   Serial No. 479,974.

*To all whom it may concern:*

Be it known that I, WILLIAM BOSS, a citizen of the United States, residing at St. Paul, in the county of Ramsey and State of Minnesota, have invented certain new and useful Improvements in Grass-Collectors, of which the following is a specification.

My invention relates to improvements in grass collectors for lawn mowers and consists particularly in an improved construction of catcher and handle whereby the handle may be removed from the receptacle and a plurality of the collectors and handles independently crated.

To this end my invention consists in the features of construction, combination and arrangement of parts hereinafter particularly described and claimed.

In the accompanying drawings forming part of this specification, Figure 1 is a perspective view of my improved grass collector, Fig. 2 is a side elevation of the same broken away, Fig. 3 is a side elevation of my grass collector shown in connection with a lawn mower, Fig. 4 is a perspective view of a plurality of collectors nested, and Fig. 5 is a similar view of a plurality of handles nested.

In the drawings A represents the framework of the collector which as shown is preferably of screening suitably secured along its upper edge within a metal rim 2. Along the front edge of the collector may be suitably secured a wire 3 having downwardly bent ends 4 forming hooks to coöperate with the removable handle B as hereinafter pointed out.

The handle B is made of wire centrally twisted to form at its rear end a loop 5 and at the front downwardly extending free ends 6. The loop 5 is adapted to fit over the downwardly extending hook 7 carried by a bracket 8 at the rear side of the collector. The downwardly extending free ends 6 are formed with hooks 9 to similarly fit into suitable brackets 10 carried by the lawn mower 12. The forwardly extending ends of the handle are also formed with eyes 13 to receive the hooked ends 4 of the wire 3. Having loose swinging support upon the end of the loop 5 is an arm 14 provided with a hooked end 15 to hook over the handle bar 16 of the lawn mower as shown in Fig. 3. The wire meshing forming the collector is preferably braced by wires 17 extending from the wire 3 underneath the collector to the bracket 8.

In use where it is desired to ship a plurality of the collectors the handles may be disconnected by first slipping the eyes 13 from the hooks 4 and then disconnecting the loop 5 from the bracket hook 7. A plurality of the collectors may then be nested together as shown in Fig. 4 and the handles nested together as shown in Fig. 5. This makes it easy to nest a large number of the collectors in the minimum space rendering shipment easier and cheaper.

I claim an my invention:

1. In combination with a lawn mower frame and handle, a grass receptacle, a handle therefor connecting the rear and sides of said receptacle, means removably supporting said receptacle upon said last named handle and means carried by the front ends of said receptacle handle for detachably engaging with said lawn mower.

2. In combination with a lawn mower frame and handle, a grass receptacle, a handle therefor connecting the rear and sides of said receptacle, means removably supporting said receptacle upon said last named handle, means carried by the front end of said handle for detachably engaging with said lawn mower, and an arm loosely supported upon the rear end of said receptacle handle and constructed to engage with the lawn mower handle.

3. In combination with a lawn mower frame and handle, a grass receptacle, a handle therefor connecting the rear and sides of said receptacle, means carried by the front and rear ends of said receptacle for removably supporting said receptacle upon said last named handle, and means for removably supporting the front end of said receptacle upon said lawn mower.

4. In combination with a lawn mower frame and handle, a grass collector, a handle therefor comprising a rear loop and forwardly extending ends, a hooked arm having swinging support upon said loop, a hook carried by the rear end of said receptacle to receive said loop, eyes carried by the forwardly extending ends of said handle, and coöperating hooks carried by the sides of said receptacle.

In testimony whereof I affix my signature in presence of two witnesses.

WILLIAM BOSS.

Witnesses:
H. S. JOHNSON,
H. SMITH.

Copies of this patent may be obtained for five cents each, by addressing the "Commissioner of Patents, Washington, D. C."